United States Patent
Lee

(10) Patent No.: US 7,720,498 B2
(45) Date of Patent: May 18, 2010

(54) APPARATUS AND METHOD FOR DISPLAYING AN IMAGE OF A SPEAKER IN A PUSH-TO-TALK COMMUNICATION SERVICE IN A PUSH-TO-TALK PORTABLE TERMINAL

(75) Inventor: Young-Joon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1321 days.

(21) Appl. No.: 11/184,773

(22) Filed: Jul. 20, 2005

(65) Prior Publication Data

US 2006/0040686 A1 Feb. 23, 2006

(30) Foreign Application Priority Data

Aug. 17, 2004 (KR) .................. 10-2004-0064784

(51) Int. Cl.
*H04B 7/00* (2006.01)
(52) U.S. Cl. .................. 455/518; 455/90.2; 455/519
(58) Field of Classification Search ............. 455/90.2, 455/412.1, 414.1, 517–520, 78, 79, 500, 455/426.1, 422.1, 416, 420; 370/352, 389, 370/338, 328
See application file for complete search history.

(56) References Cited

U.S. PATENT DOCUMENTS

| | | | | |
|---|---|---|---|---|
| 5,859,663 | A * | 1/1999 | Simon | 348/14.07 |
| 5,969,698 | A * | 10/1999 | Richard et al. | 345/7 |
| 2004/0121790 | A1 * | 6/2004 | Wolff et al. | 455/518 |
| 2005/0143135 | A1 * | 6/2005 | Brems et al. | 455/564 |
| 2005/0215233 | A1 * | 9/2005 | Perera et al. | 455/411 |
| 2005/0233776 | A1 * | 10/2005 | Allen et al. | 455/567 |
| 2005/0255871 | A1 * | 11/2005 | Saeed et al. | 455/518 |
| 2006/0030344 | A1 * | 2/2006 | Lim | 455/512 |

\* cited by examiner

*Primary Examiner*—Duc Nguyen
*Assistant Examiner*—Dominic E Rego
(74) *Attorney, Agent, or Firm*—Roylance, Abrams, Berdo & Goodman, LLP

(57) ABSTRACT

Apparatus and method are provided for displaying a push-to-talk (PTT) communication service subscriber having the right to speak in a portable terminal capable of using a PTT communication service. When the PTT communication service is executed, information of a PTT communication service subscriber having the speaking right is received. Image information is extracted from the received information of the PTT communication service subscriber having the speaking right. The extracted image information is displayed. While the PTT communication service is executed, an image of a buddy having the speaking right can be displayed. Accordingly, the PTT communication service can be realistically executed, the speaking right that is frequently shifted can be clearly identified, and user convenience can be improved.

11 Claims, 6 Drawing Sheets

APPARATUS AND METHOD FOR DISPLAYING AN IMAGE OF A SPEAKER IN A PUSH-TO-TALK COMMUNICATION SERVICE IN A PUSH-TO-TALK PORTABLE TERMINAL

PRIORITY

This application claims the benefit under 35 U.S.C. 119(a) of an application entitled "METHOD FOR DISPLAYING AN IMAGE OF A SPEAKER IN A PUSH-TO-TALK COMMUNICATION SERVICE IN A PUSH-TO-TALK PORTABLE TERMINAL", filed in the Korean Intellectual Property Office on Aug. 17, 2004 and assigned Serial No. 2004-64784, the entire contents of which are incorporated herein by reference.

BACKGROUND OF THE INVENTION

1. Field of the Invention

The present invention relates generally to a push-to-talk (PTT) communication service in a portable terminal. More particularly, the present invention relates to an apparatus and method for determining a speaker in order to display the speaker's image while a PTT communication service is executed.

2. Description of the Related Art

Conventionally, a service area of a wireless communication system for portable terminals is divided into a plurality of base station (BS) areas, and includes cells serving as small-scale service areas. The BSs perform a central control operation by means of a mobile switching center (MSC), such that a subscriber can communicate with another party while moving between cells. With the development of communication technologies, various technologies for combining an Internet protocol (IP) network and a wireless communication network are being developed. One of the various technologies is called voice over IP (VoIP) for packet-based voice service using the IP.

Because conventional packet-based call service must establish a call through a mobile communication network and an IP network, there is a drawback in that a call setup time takes a long time. To overcome this drawback, a service for an interactive call such as a group or private call can be provided using a multicast function of the IP network. The interactive call is a communication call based on interaction between users. For example, the interactive call service has a push-to-talk (PTT) function similar to walkie-talkies. The term "group call" refers to communication between multiple users within a predefined user group. The term "private call" refers to 1:1 communication between users within a predefined user group. The PTT communication service can simultaneously provide voice/data services for a plurality of users or a group. The user informs a user device, that is, a portable terminal capable of using the PTT communication service that he or she wants to speak through the PTT communication service by pressing a PTT communication service button. The user device sends a service request to a network. The network rejects the request or assigns requested resources according to a predetermined determination criterion such as resource availability or a priority of the user making the request. At this time, the user is connected to other active users within a specific subscriber group. After a voice communication connection is established, the user making the request can transfer voice, and other users can listen to the transferred voice. When the user releases the PTT communication service, a corresponding portable terminal releasing the PTT communication service transmits a release message/signal to the network, such that the resources are released. A PTT communication system can perform a point-to-point or point-to-multipoint communication service.

The PTT communication service between PTT portable terminals is initiated when a PTT portable terminal at an origination side sends a PTT call request to a PTT portable terminal at a destination side. The PTT call request is enabled when a PTT button is pressed. The destination PTT portable terminal notifies the origination PTT portable terminal that the PTT call has been received. Then, the user of the destination PTT portable terminal recognizes a PTT notification sound, and initiates the PTT call with the user of the origination PTT portable terminal. At this time, a PTT communication subscriber (referred to as a "buddy") gains the right to speak. Then, a buddy of the origination PTT portable terminal currently having the speaking right is indicated by a different color bar in a list of buddies displayed on the destination PTT portable terminal as illustrated in FIG. 5A. For example, when the PTT communication service is executed in a specific group of 10 buddies, all the 10 buddies cannot be displayed on one screen page. The 10 buddies must be displayed through multiple screen pages. Accordingly, after screen pages are shifted, the bar indicates a corresponding buddy having the speaking right. A conventional method for distinguishing and displaying a buddy having the speaking right has a drawback in that it is inconvenient for the user employing the PTT communication service to identify a buddy having the speaking right that is frequently shifted.

Because a corresponding buddy having the speaking right is indicated only by character data such as an identification (ID), the conventional PTT communication service cannot achieve a realistic visual effect.

SUMMARY OF THE INVENTION

Accordingly, the present invention has been designed to solve the above and other problems occurring in the prior art. Therefore, it is an aspect of the present invention to provide an apparatus and method that realistically displays an image of a speaker having the right to speak in a push-to-talk (PTT) communication service such that a user can clearly identify a buddy having the speaking right when the PTT communication service is performed.

The above and other aspects of the present invention can be achieved by an apparatus and method for displaying a push-to-talk (PTT) communication service subscriber having the right to speak in a portable terminal capable of using a PTT communication service. The apparatus and method comprises receiving information of a PTT communication service subscriber having the speaking right when the PTT communication service is executed; extracting image information from the received information of the PTT communication service subscriber having the speaking right; and displaying the extracted image information.

BRIEF DESCRIPTION OF THE DRAWINGS

The above and other aspects and advantages of the present invention will be more clearly understood from the following detailed description taken in conjunction with the accompanying drawings, in which.

Throughout the drawings, the same element is designated by the same reference numeral or character.

DETAILED DESCRIPTION OF EXEMPLARY EMBODIMENTS

Embodiments of the present invention will now be described in detail herein below with reference to the accompanying drawings. In the following description, a detailed description of known functions and configurations incorporated herein will be omitted for conciseness. A method for executing a push-to-talk (PTT) communication service in a PTT portable terminal in accordance with the present invention will be described, but specific details are provided only for a better understanding of the present invention. Those skilled in the art will appreciate that various modifications, additions and substitutions are possible, without departing from the scope of the present invention.

Figure 1:
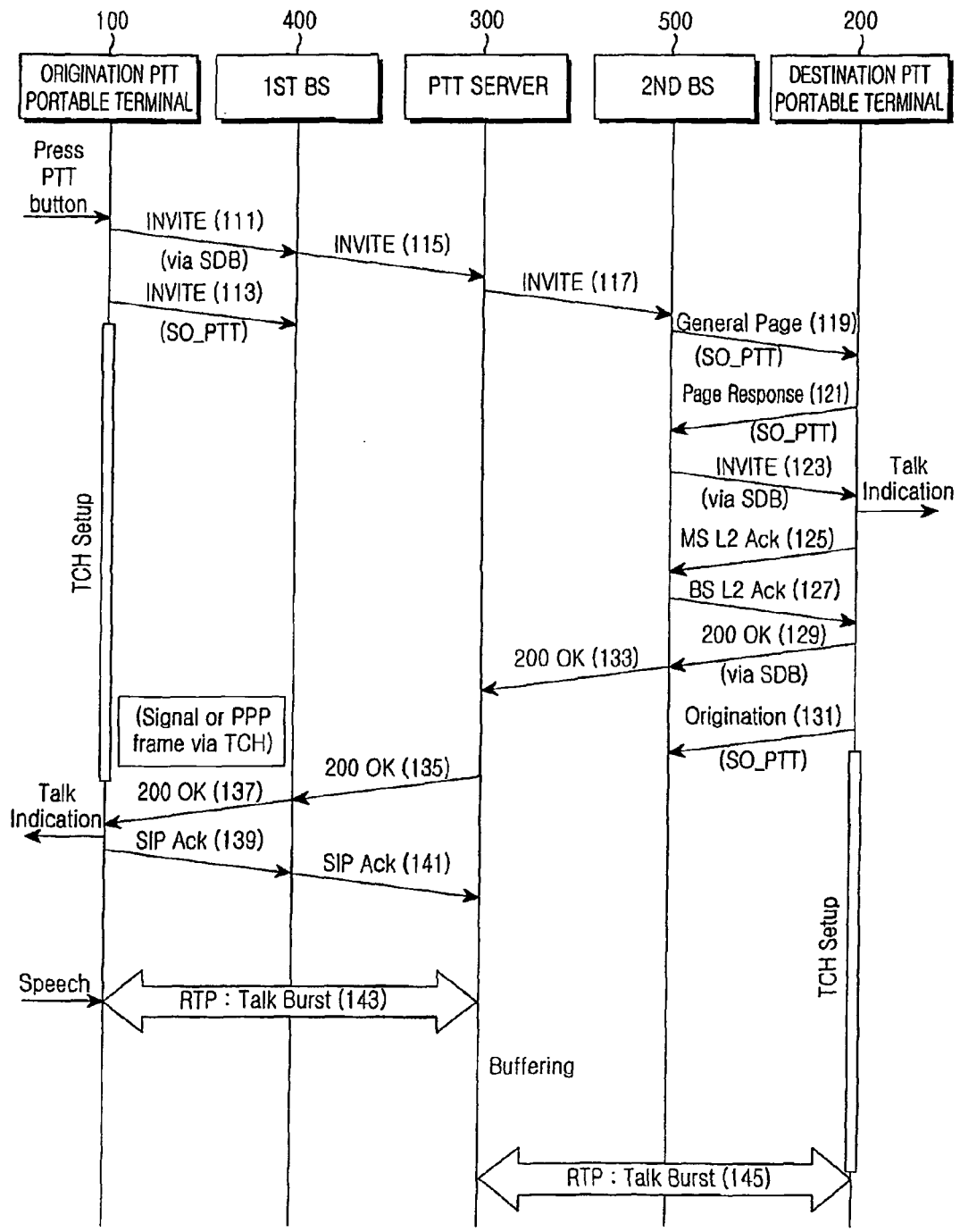
FIG. 1 is a flow chart illustrating a conventional initial process of a push-to-talk (PTT) communication system.

FIG. 1 is a flow chart illustrating a conventional initial process of a PTT communication system. Referring to FIG. 1, PTT portable terminals 100 and 200 at origination and destination sides perform service option (SO_PTT) negotiation with first and second base stations (BSs) 400 and 500 to set up a traffic channel (TCH) and perform a voice communication function through a PTT application program based on a session initiation protocol (SIP) in steps 111 to 145. First, the origination PTT portable terminal 100 transmits a PTT call request signal "INVITE" to the first BS 400 in the form of a short data burst (SDB) in step 111. Immediately after transmitting the PTT call request signal "INVITE", the origination PTT portable terminal 100 performs the traffic channel setup while performing the SO_PTT negotiation for the PTT communication service with the first BS 400. The negotiation is a process for preparing a high level session from a physical layer to an application layer including a point-to-point protocol (PPP) session. This process is denoted by "Origination" in FIG. 1.

After the PTT call request signal "INVITE" is transmitted to the first BS 400, it is transmitted to a PTT server 300 and the destination PTT portable terminal 200 for receiving the PTT communication service in steps 115 to 117. The second BS 500 periodically transmits a paging signal "General Page" to the destination PTT portable terminal 200 in step 119. In response to the paging signal, the destination PTT portable terminal 200 transmits a response signal "Page Response" to the second BS 500 in step 121. While the paging is performed, the second BS transmits the PTT call request signal "INVITE" in the form of a SDB in step 123. The destination PTT portable terminal 200 notifies a receiver that the PTT call has been established. However, because the current operating state is not a state in which the TCH has been set up, the destination PTT portable terminal does not transmit any voice to the origination PTT portable terminal 100.

In step 125, the destination PTT portable terminal 200 sends, to the second BS 500, an "MS L2 Ack" signal indicating that the PTT call request signal "INVITE" has been normally received. In step 127, the second BS 500 sends, to the destination PTT portable terminal 200, a "BS L2 Ack" signal indicating that the "MS L2 Ack" signal has been normally received.

In step 129, the destination PTT portable terminal 200 sends, to the second BS 500, a "200 OK" message in the SDB form. The "200 OK" message indicates that the destination PTT portable terminal 200 has accepted the PTT call request signal "INVITE" from the origination PTT portable terminal 100 making the initial PTT call request.

Immediately after transmitting the "200 OK" message, the destination PTT portable terminal 200 interworks with the second BS 500, and performs the TCH setup process while executing the SO_PTT negotiation in step 131.

In steps 133 to 137, the "200 OK" message is sent from the second BS 500 to the origination PTT portable terminal 100 through the PTT server 300 and the first BS 400, and the origination PTT portable terminal 100 receiving the "200 OK" message completes the TCH setup. Then, the origination PTT portable terminal 100 displays the fact that the destination side has accepted the PTT call request and the PTT call has been established.

In steps 139 and 141, the origination PTT portable terminal 100 sends a request for the right to speak to the PTT server 300 through a "SIP Ack" signal in a state in which the session has been established, and then step 143 is performed. The PTT server 300 controls the request for the speaking right and assigns the speaking right to the origination PTT portable terminal 100.

In step 143, the origination PTT portable terminal 100 having the speaking right transmits a talk burst to the PTT server 300 through a real time protocol (RTP) in real time. The talk burst is transmitted from the origination PTT portable terminal 100 to the PTT server 300, and then is primarily buffered in the PTT server 300. The talk burst of the origination PTT portable terminal 100 buffered in the PTT server 300 is transmitted from the PTT server 300 to the destination PTT portable terminal 200 through the RTP according to the completion of the TCH setup of the destination PTT portable terminal 200 in step 145. That is, the PTT server 300 transmits the buffered talk burst after the TCH setup has been completed.

The origination and destination PTT portable terminals 100 and 200 can gain the speaking right and make speech using the "SIP Ack" signal and the "ACK" signal serving as the response signal to the "SIP Ack" signal without negotiating with the PTT server 300 after the TCH setup has been completed.

Figure 2:
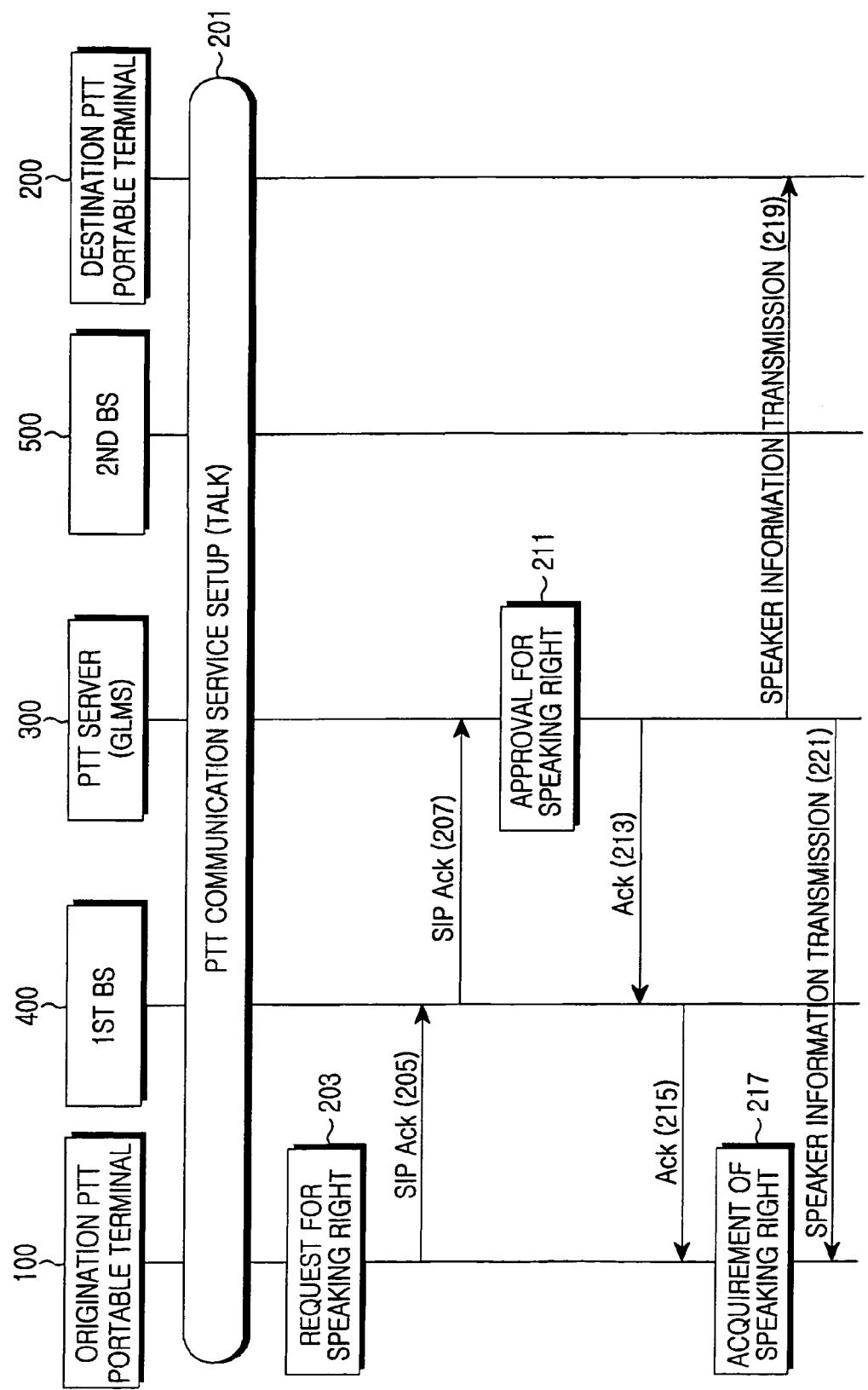
FIG. 2 is a flow chart illustrating a process for acquiring the right to speak in a PTT communication system in accordance with an embodiment of the present invention.

FIG. 2 is a flow chart illustrating a process for acquiring the speaking right in a PTT communication system in accordance with an embodiment of the present invention. Referring to FIG. 2, a user of the origination PTT portable terminal 100 inputs a button for making a request for the speaking right after the origination and destination PTT portable terminals 100 and 200 establish a PTT call service in step 201. The origination PTT portable terminal 100 detects the input button in step 203. In step 205, the origination PTT portable terminal 100 transmits the "SIP Ack" signal to the first BS 400. In step 207, the request for the speaking right is sent to the PTT server 300 through the first BS 400. The PTT server 300 approves the request for the speaking right in step 211, and transmits the "ACK" signal serving as the response to the "SIP Ack" signal to the origination PTT portable terminal 100 through the first BS 400 in steps 213 and 215, such that the origination PTT portable terminal 100 has the speaking right in step 217. A group and list management server (GLMS)

interworking with the PTT server 300 transmits information of a buddy having the speaking right to the origination and destination PTT portable terminals 100 and 200 in steps 219 and 221. The GLMS stores registered information of a PTT communication service subscriber and transmits requested subscriber information by interworking with the PTT server 300. In accordance with an embodiment of the present invention, the subscriber information can include image information. The image information can include a photo, moving picture or avatar registered by the PTT communication service subscriber. The PTT communication service subscriber can register the image information by directly uploading the image information or selecting a desired image from among images provided by a provider.

Figure 3:
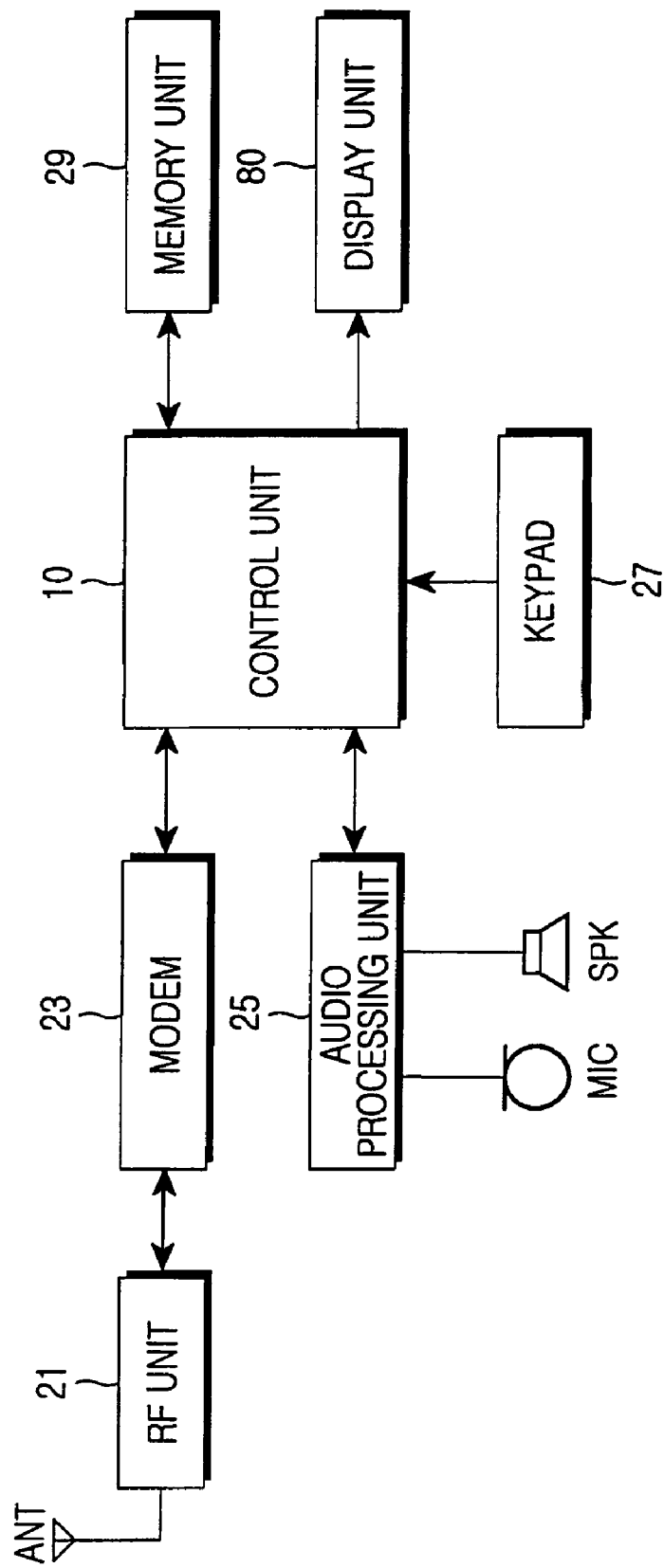
FIG. 3 is a block diagram illustrating a PTT portable terminal in accordance with an embodiment of the present invention.

FIG. 3 is a block diagram illustrating a PTT portable terminal in accordance with an embodiment of the present invention. Referring to FIG. 3, a radio frequency (RF) unit 21 performs a communication function for the portable terminal. The RF unit 21 includes an RF transmitter (not shown) for up converting and amplifying a frequency of a signal to be transmitted, and an RF receiver (not shown) for low-noise amplifying a received signal and down converting a frequency of the received signal.

A modulator-demodulator (MODEM) 23 includes a transmitter (not shown) for coding and modulating the signal to be transmitted and a receiver (not shown) for demodulating and decoding the received signal. That is, the MODEM 23 processes packet data or an audio signal such as voice, and so on.

An audio processing unit 25 can configure a coder-decoder (CODEC). The CODEC includes a data CODEC for processing packet data, and so on and an audio CODEC for processing an audio signal such as voice, and so on The audio processing unit 25 includes the CODEC for converting a digital audio signal received by the MODEM 23 into an analog audio signal to reproduce the analog signal or converting an analog audio signal generated from a microphone (MIC) into a digital audio signal to transmit the digital audio signal to the MODEM 23. The CODEC may be configured separately or may be included in a control unit 10. Moreover, the audio processing unit 25 receives audio data from the MODEM 23 through the control unit 10, converts the received audio data into audible sound, and then outputs the audible sound through a speaker (SPK). The audio processing unit 25 converts an audio signal input from the microphone (MIC) into data, and then outputs the data to the control unit 10.

A keypad 27 includes keys necessary to input number and letter information and function keys necessary to set various functions. More specifically, the keypad 27 can include a function key for the PTT communication service in accordance with the embodiment of the present invention. For example, PTT communication service mode can be set or released by a single key input. The keypad 27 can include a shortcut number input key for entering a shortcut number, and so on.

A memory unit 29 can comprise program and data memories, and so on. The program memory can store programs for controlling overall operation of the PTT portable terminal. The data memory performs a function for temporarily storing data generated during execution of the programs. More specifically, the program memory stores a program for determining and displaying information of a buddy having the speaking right in the PTT communication service in accordance with the embodiment of the present invention.

The control unit 10 performs a function for controlling the overall operation of the PTT portable terminal. In accordance with the embodiment of the present invention, the control unit 10 transmits the "SIP Ack" signal when the request for the speaking right is made. When the speaking right is granted, the control unit 10 receives, from the PTT server 300, the "ACK" signal serving as the response to the "SIP Ack" signal. The control unit 10 receives, from the GLMS, information of a buddy having the speaking right, and extracts and outputs image information. More specifically, the control unit 10 outputs a large sized mark for identifying the buddy having the speaking right, and outputs a small sized mark for identifying a buddy not having the speaking right. The control unit 10 flickers the mark for identifying the buddy having the speaking right. Alternatively, the control unit 10 may include the MODEM 23.

A display unit 80 displays messages generated during program execution according to a control operation of the control unit 10. In accordance with an embodiment of the present invention, the display unit 80 displays buddy information of a specific group, and displays image information or a mark for identifying a buddy having the speaking right. The display unit 80 can comprise a liquid crystal display (LCD). In this case, the display unit 80 can comprise a LCD controller, a memory capable of storing image data, a LCD element, and so on. When the LCD is implemented using a touch-screen system, the keypad 27 and the LCD can serve as an input unit.

Operation of the PTT portable terminal will be described with reference to FIG. 3. When the user sets a signal transmission mode after a dialing operation is performed through the keypad 27, the control unit 10 detects the set signal transmission mode, controls the MODEM 23 to process received dial information, and controls the RF unit 21 to convert the processed information into an RF signal and output the RF signal. Subsequently, when a called party generates a response signal, the control unit 10 detects the response signal through the RF unit 21 and the MODEM 23. The user performs a communication function by means of a voice communication path established through the audio processing unit 25. On the other hand, when signal reception mode is performed, the control unit 10 detects the signal reception mode through the MODEM 23 and controls the audio processing unit 25 to generate a ringtone. Subsequently, when the user responds, the control unit 10 detects the response. The user performs a communication function by means of a voice communication path established through the audio processing unit 25. Although an example of voice communication in the signal transmission and reception modes has been described above, a data communication function for communicating packet data and image data other than the voice communication can be performed. When the idle mode is entered, or character or text communication is performed, the control unit 10 controls the display unit 80 to display character or text data processed through the MODEM 23. An operation for displaying an image of a speaker having the speaking right in the PTT communication service will now be described. When the speaking right is shifted from one buddy to another in the PTT communication service, the control unit 10 receives, from the GLMS, information of a buddy having the speaking right and determines if image information is present. If image information is present, the control unit 10 controls the display unit 80 to display an image registered by a subscriber having the speaking right.

Figure 4:
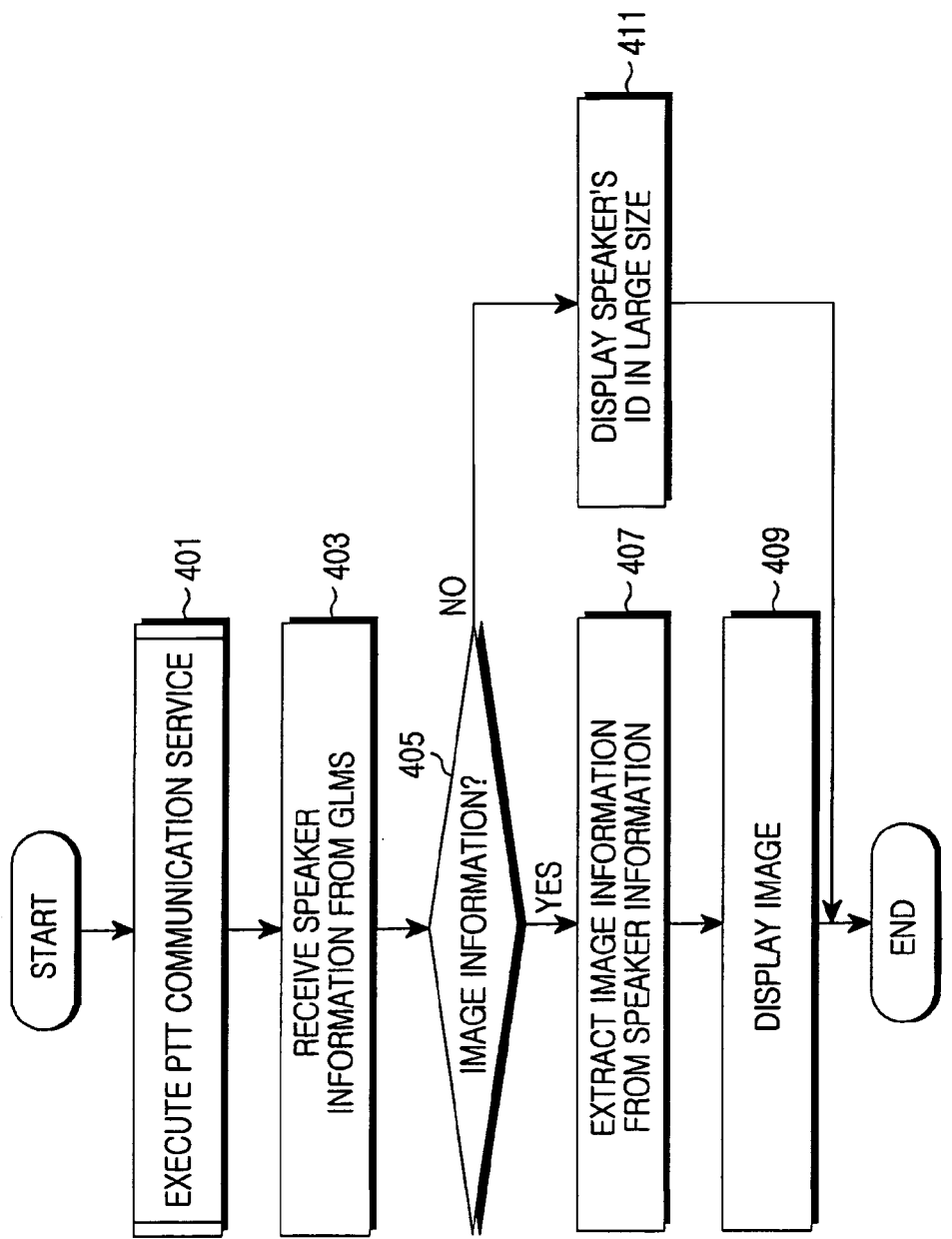
FIG. 4 is a flow chart illustrating a process for displaying an image of a speaker in the PTT portable terminal in accordance with an embodiment of the present invention.
Figure 5A:
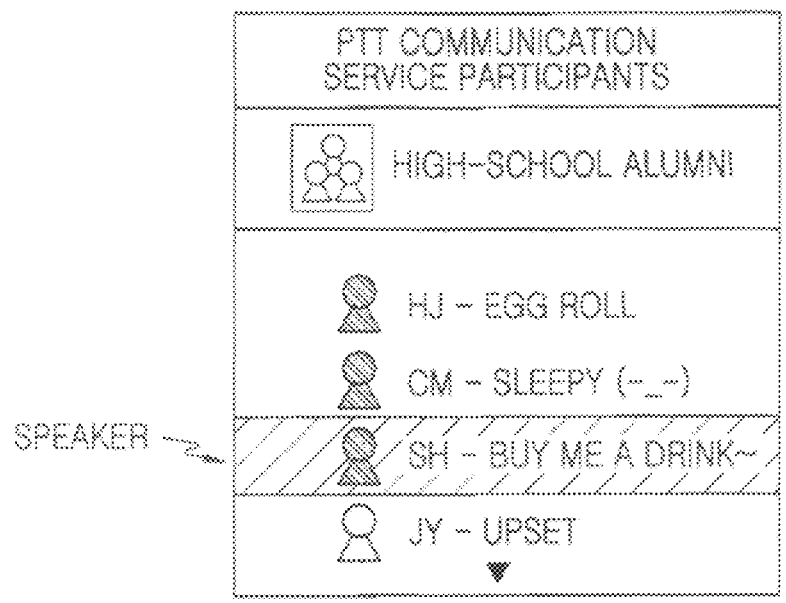
FIG. 5A illustrates an example of displaying a PTT communication service screen in a conventional PTT portable terminal.
Figure 5B:
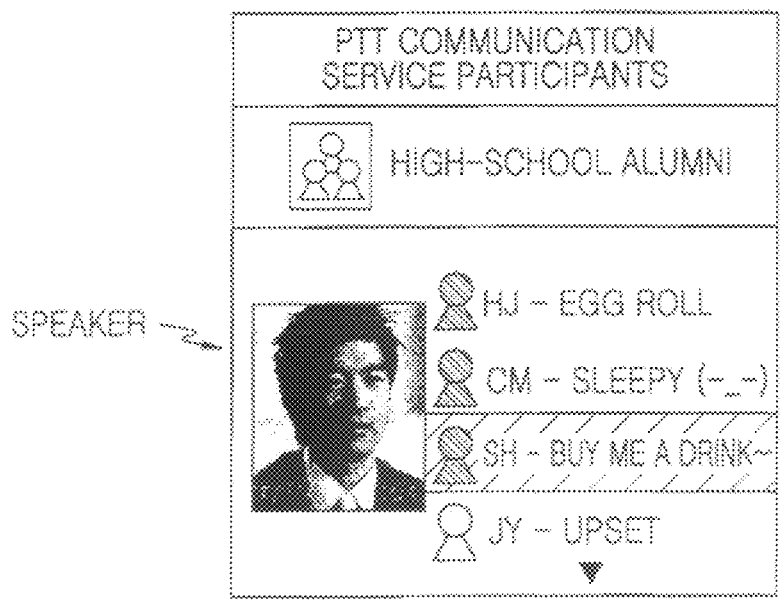
FIGS. 5B and 5C illustrate examples of displaying PTT communication service screens in the PTT portable terminal in accordance with an embodiment of the present invention.
Figure 5C:
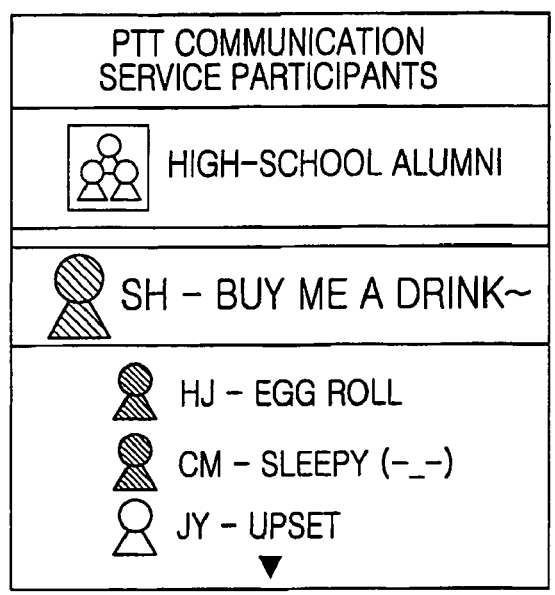

FIG. 4 is a flow chart illustrating a process for displaying an image of a speaker in the PTT portable terminal in accordance with an embodiment of the present invention. FIGS. 5B and 5C illustrate examples of displaying PTT communication service screens in the PTT portable terminal in accordance with an embodiment of the present invention. Referring to FIG. 4, when the speaking right is shifted to another buddy while the PTT communication service is executed in step 401, the GLMS interworking with the PTT server transmits information of the buddy having the speaking right. Now, a process for executing the PTT communication service will be described briefly. When the PTT portable terminal transmits a PTT call request signal, the PTT call request signal is transmitted to a receiving PTT portable terminal through the BS and the PTT server. The receiving PTT portable terminal transmits a PTT call approval signal and completes a session connection. Subsequently, when the PTT portable terminal sends a request for the speaking right to the PTT server through the "SIP Ack" signal in a state in which the session has been established, the PTT server controls and assigns the speaking right. The GLMS interworking with the PTT server transmits information registered by a PTT communication service subscriber having the speaking right. The GLMS stores information registered by the PTT communication service subscriber. When an information request is made or an application for establishing the PTT communication service session is run, the GLMS transmits corresponding buddy information. In accordance with a feature of the present invention, the buddy information may include image information.

When the GLMS transmits the information of the buddy having the speaking right, the control unit 10 receives, from the GLMS, the information of the buddy having the speaking right by controlling the RF unit 21 and the MODEM 23 in step 403. The control unit 10 determines if image information is included in the received buddy information in step 405. If image information is included in the received buddy information, the control unit 10 extracts the image information in step 407, and displays the extracted image information as illustrated in FIG. 5B in step 409. Referring to FIG. 5B, a service state indication bar is positioned at the top end of a screen illustrated in FIG. 5B, and an icon denoting a group and a group name are displayed below the service state indication bar. The service state indication bar indicates "a state in which a request for the speaking right is being made", "a state in which speaking is in progress after acquiring the speaking right", "a state in which the speaking right has been released", and "a state in which speaking is disabled during reception" according to colors. An image of a buddy having the speaking right and a list of buddies participating in a dialog are displayed below the displayed group name. The buddy image may be a photo, moving picture or avatar. The list of buddies participating in the dialog displays icons and marks for identifying the buddies registered in the group. The icon indicates if an incoming signal has been completely received. If an incoming signal has been completely received, a color of the icon is changed.

However, if image information is not included in the received buddy information, the control unit 10 controls the memory unit 29 and the display unit 80 to display a mark for identifying a buddy having the speaking right in step 411 as illustrated in FIG. 5C. Referring to FIG. 5C, a service state indication bar is positioned at the top end of a screen illustrated in FIG. 5C, and an icon denoting a group and a group name are displayed below the service state indication bar. The service state indication bar indicates "a state in which a request for the speaking right is being made", "a state in which speaking is in progress after acquiring the speaking right", "a state in which the speaking right has been released", and "a state in which speaking is disabled during reception" according to colors. An image of a buddy having the speaking right and a list of buddies participating in a dialog are displayed below the displayed group name. A mark for identifying a buddy having the speaking right is displayed below the group name in a large size. Other buddies participating in the dialog are displayed in a small size. The mark for identifying the buddy having the speaking right can be flickered.

As apparent from the above description, embodiments of the present invention can display an image of a buddy having the speaking right while a push-to-talk (PTT) communication service is executed. Accordingly, the PTT communication service having realistic visual effect can be executed, the speaking right that is frequently shifted can be clearly identified, and user convenience can be improved.

Although certain embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for displaying a push-to-talk (PTT) communication service subscriber having the right to speak in a portable terminal capable of using a PTT communication service, comprising:
    receiving information of a PTT communication service subscriber having the speaking right when the PTT communication service is executed;
    extracting image information from the received information of the PTT communication service subscriber having the speaking right, wherein said image information is used to differentiate a service subscriber having a speaking right from a subscriber not having a speaking right; and
    displaying the extracted image information,
    wherein displaying a mark for identifying the PTT communication service subscriber having the speaking right in a large size if the image information is not included in the received information of the PTT communication service subscriber having the speaking right.

2. A method for displaying a push-to-talk (PTT) communication service subscriber having the right to speak in a portable terminal capable of using a PTT communication service, comprising:
    receiving information of a PTT communication service subscriber having the speaking right when the PTT communication service is executed;
    determining if image information is included in the received information of the PTT communication service subscriber having the speaking right;
    extracting the image information if image information is included in the received information of the PTT communication service subscriber having the speaking right; and
    displaying the extracted image information,
    wherein displaying a mark for identifying the PTT communication service subscriber having the speaking right in a large size if the image information is not included in the received information of the PTT communication service subscriber having the speaking right.

3. The method according to claim 2, further comprising:
    flickering a mark for identifying the PTT communication service subscriber having the speaking right if the image information is not included in the received information of the PTT communication service subscriber having the speaking right.

4. The method according to claim 2, further comprising:
    displaying a mark for identifying the PTT communication service subscriber not having the speaking right in a small size if the image information is not included in the received information of the PTT communication service subscriber having the speaking right.

5. An apparatus for displaying a push-to-talk (PTT) communication service subscriber having the right to speak in a portable terminal capable of using a PTT communication service, comprising:
a memory for storing received information; and
a controller for receiving information of a PTT communication service subscriber having the speaking right when the PTT communication service is executed, extracting image information from the received information of the PTT communication service subscriber having the speaking right, wherein said image information is used to differentiate a service subscriber having a speaking right from a subscriber not having a speaking right and displaying the extracted image information on a display,
wherein the controller display a mark for identifying the PTT communication service subscriber having the speaking right in a large size if the image information is not included in the received information of the PTT communication service subscriber having the speaking right.

6. The apparatus according to claim 5, further comprising:
a group and list management server (GLMS) for transmitting the information of the PTT communication service subscriber having the speaking.

7. The apparatus according to claim 5, wherein the controller differentiates a service subscriber having a speaking right from a subscriber not having a speaking right via a difference in a size of subscriber IDs if the received information does not comprise image information.

8. The apparatus according to claim 7, wherein the service subscriber having the speaking right has a subscriber ID that is larger in size than the subscriber ID of the subscriber not having the speaking right.

9. An apparatus for displaying a push-to-talk (PTT) communication service subscriber having the right to speak in a portable terminal capable of using a PTT communication service, comprising:
a memory for storing received information; and
a controller for receiving information of a PTT communication service subscriber having the speaking right when the PTT communication service is executed, determining if image information is included in the received information of the PTT communication service subscriber having the speaking right, extracting the image information if the image information is included in the received information of the PTT communication service subscriber having the speaking right and displaying the extracted image information on a display,
wherein the controller display a mark for identifying the PTT communication service subscriber having the speaking right in a large size if the image information is not included in the received information of the PTT communication service subscriber having the speaking right.

10. The apparatus according to claim 9, wherein the controller flickers a mark for identifying the PTT communication service subscriber having the speaking right if the image information is not included in the received information of the PTT communication service subscriber having the speaking right.

11. The apparatus according to claim 9, wherein the controller displays a mark for identifying the PTT communication service subscriber not having the speaking right in a small size if the image information is not included in the received information of the PTT communication service subscriber having the speaking right.

* * * * *